United States Patent [19]

Reese et al.

[11] 3,997,498

[45] Dec. 14, 1976

[54] NON-SMUDGE CORRECTION FLUID

[75] Inventors: William P. Reese, Canandaigua; Ira L. Seldin, Rochester, both of N.Y.

[73] Assignee: Xerox Corporation, Stamford, Conn.

[22] Filed: July 24, 1975

[21] Appl. No.: 598,501

[52] U.S. Cl. .................. 260/33.8 UA; 106/19; 106/30; 427/14; 427/140

[51] Int. Cl.$^2$ .................. C08K 5/02; C09D 11/10

[58] Field of Search .................. 106/19, 30; 260/33.8 UA; 427/140

[56] References Cited

UNITED STATES PATENTS 3,276,870  10/1966  Bitting et al. .................. 260/42.52
3,664,869  5/1972  Sala et al. .................. 427/140

Primary Examiner—Donald E. Czaja
Assistant Examiner—H. H. Fletcher
Attorney, Agent, or Firm—James J. Ralabate; James P. O'Sullivan; Jerome L. Jeffers

[57] ABSTRACT

Disclosed is a correction fluid for use in obscuring mistakes on certain typewritten or printed documents. The fluid comprises a liquid, highly halogenated ethane containing at least one fluorine substituent as solvent, an opacifying pigment and an organic resin as binder for the pigment.

8 Claims, No Drawings

NON-SMUDGE CORRECTION FLUID

BACKGROUND OF THE INVENTION

Various compositions for the correction of typewritten or other printed material have been known for some time. For example, U.S. Pat. No. 3,276,870 discloses a correction fluid comprising a pigment and a resin binder in a solvent for the binder such as toluene or methyl ethyl ketone. This sort of correction fluid works well when applied to certain types of printed material such as those created by the use of inks consisting of a dye or pigment in a solvent in which drying is accomplished by rapid penetration of the ink into the paper and evaporation of the solvent, since little difficulty is encountered in providing a solvent for the resin binder in the correction fluid which is a non-solvent for the dye or pigment of the ink.

The advent of inks comprised of a pigment dispersed in an organic resin in which the ink image is deposited on the substrate and heat or solvent fused to a continuous film (as in the case of electrostatic printing) or pressure fused (as in the case of certain typing methods) has created problems with the use of correction fluids containing conventional organic liquids as solvent for the resin binder of the correction fluid. This is the case because the use of these correction fluids to correct documents in which the image is of the organic resin/pigment type ink results in the resin binder of the ink being at least partially dissolved by the correction fluid. This dissolution of the ink resin during application of the correction fluid results in release of the ink pigment, which is usually black, into the correction fluid. The release of this black pigment into the correction fluid, which is usually pigmented white, results in a smeary, gray colored coating which is, of course, undesirable. In order to obtain a white area upon correction of an error, the use of successive applications of the correction fluid is necessary.

Accordingly, it would be desirable, and it is an object of the present invention to provide a novel correction fluid for printed and/or typed matter.

An additional object is to provide such a correction fluid which is suitable for use in correcting printed matter which contains an image of an organic resin having a pigment dispersed in it which is fused onto a paper backing.

A further object is to provide such a correction fluid which can be used to cover an image of the resin/pigment ink to provide a clean white surface in a single application.

SUMMARY OF THE INVENTION

The present invention is a correction fluid composition for selective application to a paper sheet having markings thereon, which comprises:

a. a liquid highly halogenated ethane containing at least one fluorine atom bonded directly to a carbon atom as solvent, b. an opacifying pigment in an amount sufficient to opacify the markings on the paper sheet upon application of the correction fluid thereto; and c. an air drying, film forming, organic resin binder for the pigment which is soluble in said halogenated ethane.

DETAILED DESCRIPTION

The present invention accomplishes the aforementioned objects due to the insolubility of most organic resins in the halogenated ethane solvent. This limited solubility renders the selection of a binder resin for the pigment in the correction fluid of utmost importance since only those resins which are soluble in the halogenated solvent to a significant degree are suitable. Selection of suitable binder resins may be accomplished empirically. However, the selection of effective solvent/resin systems can be expedited by using solubility parameter data in order to devise solvent formulating maps. This technique is discussed by J. H. Hildebrand et al. in *The Solubility of Nonelectrolytes*, 3rd ed., Reinhold, New York, 1950. In addition to being soluble in the halogenated ethane, the resin should be capable of forming a flexible film when it is deposited on a surface in solution and subsequently air dried. Examples of resins which are suitable are poly (n-butyl methacrylate); low molecular weight copolymers of isobutyl methacrylate and n-butyl methacrylate; poly(isobutyl methacrylate); alkyds such as 45% soy, pentaerythritol phthalate; coumarone-indene resins sold under the tradename Neville; thermoplastic poly(styrene) resins; butadiene-styrene copolymers; and vinyl ethers such as poly(vinyl ethyl or butyl ethers).

Since most of the documents to be corrected by the fluid will be on white paper, the opaque pigment will generally be a white material selected from the class known as prime hiding pigments which are capable of imparting a high degree of opacity to the coating. The preferred pigment for white backgrounds is rutile titanium dioxide. Suitable pigments include in addition to rutile titanium dioxides, anatase titanium dioxides, zinc sulfide, zinc oxide and basic lead carbonate or sulphate. Suitable colored pigments may also be used for the purpose of matching the coating composition with a colored base material to which it may be applied.

Solvent selection is based on the primary consideration that the material be a non-solvent for the resin in the ink to be coated. Additional requirements are that the solvent not be so volatile that the fluid will have an inordinately short shelf life and that its vapor pressure not be so low that it will not quickly evaporate upon application of the correction fluid. Highly halogenated ethanes containing at least one fluorine atom bonded directly to one of the carbon atoms have been found to meet these criteria. Specific halogenated ethanes suitable for use as solvent in the present invention include $CCl_3-CCl_2F$, $CCl_2F-CCl_2F$, $CCl_3-CClF_2$, $CCl_3-CF_3$, $CCl_2F-CClF_2$, $CH_2Cl-CClF_2$, $CH_2Br CH_2F$ and $CClF_2-CCl_3$. In view of their vapor pressures, which are neither too low nor too high, $CCl_2F-CCl_2F$ and $CCl_3-CClF_2$ are the preferred solvents.

In addition to the three primary components of the correction fluid, i.e. solvent, pigment and binder resin, a suitable non-volatile plasticizer which is soluble in the solvent for example Beckolin 27 modified rosin oils may be added to the correction fluid to reduce embrittlement and thereby prevent chipping or flaking off of the dried coating.

In the preparation of the correction fluid, the amount of pigment will typically comprise from about 15 to 35 weight percent of the solids. Smaller amounts can be used, but hiding power of the fluid will, of course, be reduced. In addition, the coating may not provide a totally satisfactory base for the imprinting of corrections thereon. Greater amounts of pigment can be used but is less desirable because very high pigment loadings will cause the resulting coating to become powdery and not very adhesive to the surface upon which the coating is applied. Sufficient halogenated ethane is employed as solvent to provide a fluid which can readily be applied to the surface to be corrected. Thus, the optional amount of solvent may vary between particular formulations, depending on the type and amount of pigment and binder resin, but such amount can be determined with only routine experimentation.

The amount of halogenated ethane solvent should be sufficient to allow free flow characteristics and form a relatively thin film of coating material upon application. Typically, the correction fluid is subjected to mixing techniques such as ball milling to ensure thorough dispersion.

The material is applied to the area to be corrected, normally by brushing, and the solvent allowed to dry, whereupon the corrected markings can be typed or written on the layer of dry correction material. Since the correction fluid does not dissolve the resin in the ink being covered, the color of the corrected area will not be distorted, and when a white pigmented fluid is used, the repaired area will appear as pure white, provided of course that sufficient pigment is used to totally opacify the fluid.

The invention is further illustrated by the following examples.

EXAMPLE I

A correction fluid according to the present invention is prepared by combining the following ingredients:
150 gms. $CCl_2FCCl_2F$
5 gms. poly(isobutyl methacrylate)
5 gms. of a 50/50 copolymer of poly(n-butyl methacrylate/isobutyl methacrylate)
50 gms. rutile titanium dioxide.

The above formulation is ball milled for 16 hours in a OO ball mill using porcelain pebbles as the agitator to provide a homogeneous, white fluid having a viscosity of approximately 150 cps.

The fluid is brushed onto an electrostatically reproduced copy consisting of an image of toner material containing poly($\alpha$-methyl styrene) resin having carbon black dispersed therein on a white paper background. The fluid is observed to cover the image areas well and upon air drying leaves an even white film on the paper. No smudging or bleeding through of the electrostatically applied ink is observed.

EXAMPLE II

A correction fluid similar to that of Example I is prepared except that toluene is used as the solvent. Upon application of the fluid to the copy the white fluid is observed to take on a grayish cast due to the partial dissolution of the ink being coated in the toluene. After drying of the fluid, a second and occasionally a third application of the fluid is necessary to provide a layer over the corrected portion which has adequate whiteness.

What is claimed is:
1. A correction fluid composition for selective application to a paper sheet having markings thereon, comprising:
  a. a liquid, highly halogenated ethane containing at least one fluorine atom bonded directly to a carbon atom as solvent in an amount sufficient to allow free flow characteristics of the fluid and cause it to form a thin film upon application, said halogenated ethane being characterized by the formula $CCl_3-CCl_2F$, $CCl_2F-CCl_2F$, $CCl_3-CClF_2$, $CCl_3-CF_3$, $CCl_2F-CClF_2$, $CH_2Cl-CClF_2$, $CH_2Br-CH_2F$ or $CClF_2-CCl_3$,
  b. an opacifying pigment in an amount of from about 15 to 35 weight percent of the solid phase of the fluid; and
  c. an air drying, film forming resin binder for the pigment which is soluble in said halogenated ethane.

2. The composition of claim 1 wherein the resin is poly(n-butyl methacrylate); a low molecular weight copolymer of isobutyl methacrylate and n-butyl methacrylate; poly(isobutyl methacrylate); an alkyd; a coumarone-indene resin; a butadiene-styrene copolymer or a vinyl ether.

3. The composition of claim 1 wherein the pigment is selected from the class of white prime hiding pigments.

4. The composition of claim 3 wherein the pigment is rutile titanium dioxide, anatose titanium dioxide, zinc sulfide, zinc oxide or a basic carbonate or sulphate.

5. The composition of claim 4 wherein the pigment is rutile titanium dioxide.

6. The composition of claim 1 wherein the solvent is $CCl_2F-CClF_2$ or $CCl_3-CClF_2$.

7. The composition of claim 1 containing a nonvolatile plasticizer in addition to the primary ingredients.

8. The composition of claim 1 wherein:
  a. the solvent is $CCl_2F-CCl_2F$,
  b. the resin binder is a mixture of poly(n-butylmethacrylate) and a copolymer of poly(n-butylmethacrylate/isobutyl methacrylate), and
  c. the pigment is rutile titanium dioxide.

* * * * *